(12) United States Patent
Lohberg et al.

(10) Patent No.: US 8,989,949 B2
(45) Date of Patent: Mar. 24, 2015

(54) ELECTRONIC MOTOR VEHICLE CONTROL SYSTEM OF MODULAR DESIGN (75) Inventors: Peter Lohberg, Friedrichsdorf (DE); Michael Zydek, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 524 days.

(21) Appl. No.: 12/738,712

(22) PCT Filed: Oct. 20, 2008

(86) PCT No.: PCT/EP2008/064119
§ 371 (c)(1),
(2), (4) Date: Jul. 7, 2010

(87) PCT Pub. No.: WO2009/050297
PCT Pub. Date: Apr. 23, 2009

(65) Prior Publication Data
US 2010/0299018 A1    Nov. 25, 2010

(30) Foreign Application Priority Data

Oct. 20, 2007 (DE) .......................... 10 2007 050 208
Sep. 12, 2008 (DE) .......................... 10 2008 046 957

(51) Int. Cl.
*B60T 8/171* (2006.01)
*B60T 8/1755* (2006.01)
*B62D 15/02* (2006.01)
*B60G 17/0195* (2006.01)

(52) U.S. Cl.
CPC ............. *B60T 8/171* (2013.01); *B60G 17/0195* (2013.01); *B60T 8/1755* (2013.01); *B60T 2260/06* (2013.01); *B60T 2260/08* (2013.01); *B60T 2260/09* (2013.01)
USPC .......................... 701/30.3; 701/30.4; 701/31.4

(58) Field of Classification Search
CPC   B60G 17/0195; B60G 17/0162; B60T 8/171; B60T 8/1755; B60T 8/321; B60T 13/74; B60T 13/043; B60R 16/0233; B60R 21/01; B60R 21/13; B60W 10/18; B60W 30/08; B60C 23/04; B60C 23/061
USPC .................... 701/31.4, 76, 45, 79, 29, 70, 72; 702/41; 180/65.28, 400; 235/375; 340/442
See application file for complete search history.

(56) References Cited

U.S. PATENT DOCUMENTS 5,266,781 A * 11/1993 Warwick et al. ............... 235/375
5,455,770 A    10/1995 Hadeler et al.
5,462,342 A    10/1995 Goebels
5,510,989 A     4/1996 Zabler et al.
(Continued)

FOREIGN PATENT DOCUMENTS

DE    4014561 A1    11/1991
DE    4227083 A1     2/1994
(Continued)

*Primary Examiner* — Tuan C. To
*Assistant Examiner* — Yuri Kan
(74) *Attorney, Agent, or Firm* — RatnerPrestia (57) ABSTRACT A modularly constructed electronic motor vehicle control system, includes wheel speed sensor inputs, at least one brake controller, and inertial sensors. The signals from the wheel speed sensors are fed into a chassis base module. The module evaluates the signals and feeds them to an electronic brake controller spatially separated from the chassis base module. The chassis base module and the brake controller are disposed in separate control device housings.

14 Claims, 5 Drawing Sheets

(56) References Cited

U.S. PATENT DOCUMENTS

| | | | |
|---|---|---|---|
| 6,015,193 A | 1/2000 | Vogel et al. | |
| 6,264,289 B1 | 7/2001 | Franke et al. | |
| 6,317,675 B1 | 11/2001 | Stölzl et al. | |
| 6,339,322 B1 | 1/2002 | Loreck et al. | |
| 6,400,044 B1 | 6/2002 | Lohberg et al. | |
| 6,542,847 B1 | 4/2003 | Lohberg et al. | |
| 6,571,163 B1 | 5/2003 | Heckmann et al. | |
| 2003/0201879 A1* | 10/2003 | Munch et al. | 340/442 |
| 2004/0010383 A1* | 1/2004 | Lu et al. | 702/41 |
| 2004/0066183 A1 | 4/2004 | Lohberg et al. | |
| 2004/0102888 A1 | 5/2004 | Burgdorf et al. | |
| 2005/0029859 A1 | 2/2005 | Bensch et al. | |
| 2005/0080542 A1* | 4/2005 | Lu et al. | 701/70 |
| 2005/0278107 A1* | 12/2005 | Disser et al. | 701/76 |
| 2006/0041366 A1* | 2/2006 | Kato et al. | 701/72 |
| 2006/0111829 A1* | 5/2006 | Williams | 701/79 |
| 2008/0053739 A1* | 3/2008 | Chernoff et al. | 180/400 |
| 2008/0147277 A1* | 6/2008 | Lu et al. | 701/45 |
| 2008/0312790 A1 | 12/2008 | Fey et al. | |
| 2010/0025131 A1* | 2/2010 | Gloceri et al. | 180/65.28 |
| 2010/0299018 A1* | 11/2010 | Lohberg et al. | 701/29 |

FOREIGN PATENT DOCUMENTS

| | | |
|---|---|---|
| DE | 4228893 A1 | 3/1994 |
| DE | 4305155 A1 | 8/1994 |
| DE | 19634715 A1 | 3/1998 |
| DE | 19755431 A1 | 6/1999 |
| DE | 19853036 A1 | 6/1999 |
| DE | 19911774 A1 | 12/1999 |
| DE | 19921692 A1 | 5/2000 |
| DE | 19941481 A1 | 3/2001 |
| DE | 10056549 A1 | 6/2002 |
| DE | 10146949 A1 | 6/2002 |
| DE | 10150760 A1 | 8/2002 |
| DE | 10203207 A1 | 7/2003 |
| DE | 10336611 A1 | 3/2005 |
| DE | 102004056105 A1 | 5/2006 |
| DE | 102005000988 A1 | 7/2006 |
| DE | 102006008958 A1 | 9/2006 |
| DE | 102006036270 A1 | 6/2007 |
| EP | 0999117 A2 | 5/2000 |
| EP | 1313635 B1 | 4/2005 |
| EP | 1695886 A1 | 8/2006 |

\* cited by examiner

PRIOR ART

Fig. 3

PRIOR ART

ELECTRONIC MOTOR VEHICLE CONTROL SYSTEM OF MODULAR DESIGN

CROSS REFERENCE TO RELATED APPLICATIONS

This application is the U.S. national phase application of PCT International Application No. PCT/EP2008/064119, filed Oct. 20, 2008, which claims priority to German Patent Application No. 10 2007 050 208.9, filed Oct. 20, 2007 and German Patent Application No. 10 2008 046 957.2, filed Sep. 12, 2008, the contents of such applications being incorporated by reference herein.

FIELD OF THE INVENTION

The invention relates to an electronic motor vehicle control system of modular design.

BACKGROUND OF THE INVENTION

EP 1 313 635 B1, which is incorporated by reference, discloses a vehicle movement dynamics control device which is composed of a valve block and an electronic controller unit which is permanently connected to the valve block, wherein electronic components, at least for the braking intervention, are arranged within the controller unit, which electronic components process signals from at least one vehicle movement dynamics sensor such as a yaw rate sensor and/or acceleration sensor, and wherein at least electrohydraulic valves are arranged in the valve block, wherein, in addition, at least one vehicle movement dynamics sensor is integrated into the electronic controller unit or the valve block, and wherein finally the latter is mechanically connected, in particular, to the housing of the electronic controller unit or is enclosed thereby.

SUMMARY OF THE INVENTION

Taking the prior art described above as a starting point, an object of the present invention consists in specifying an electronic motor vehicle control system which is of modular design and which better meets contemporary requirements made of modern motor vehicles with complex electronic control systems.

The motor vehicle control system according to aspects of the invention comprises a chassis base module which serves for modularizing chassis control systems in motor vehicle engineering, in particular in systems which, in terms of control technology, react directly or indirectly to the signals of the, for example, four wheel speed sensors of a passenger motor vehicle and/or of inertial sensors for measuring the rotation rate and/or longitudinal acceleration of the vehicle. The signals of the wheel speed sensors are therefore fed to the chassis base module, wherein the latter evaluates the signals of the wheel speed sensors and feeds them to an electronic brake controller which is arranged in a spatially separated fashion from the chassis base module. In this context, the chassis base module and the brake controller are preferably arranged in separate control device housings.

For example, contemporary vehicle functions such as the electronic stability control by braking intervention (ESC or else ESP), the stability control by means of electronic steering correction, vehicle passenger protection systems (for example passive such as airbag, seat belt tensioner etc. or active, for example driver assistance systems such as Contiguard®) or systems for situation-dependent spring/damper control can be integrated into the above system.

In the case of a hydraulic braking principle, the control system according to aspects of the invention preferably additionally comprises a hydraulic unit into which at least the hydraulic valves for actuating the brakes are integrated. In this context, at least the electronic brake controller preferably forms, with the hydraulic unit, an integrally, in particular permanently connected unit. However, it is also possible for the hydraulic unit to be arranged separately from the brake controller. The brakes can alternatively also be actuated pneumatically or electrically. Mixed actuation is also conceivable and advantageous in certain application cases, for example if a combination with an electric parking brake is performed at the rear axle, while a hydraulic or pneumatic principle has priority at the front axle.

The inertial sensor or sensors, which comprises/comprise, for example, a yaw rate sensor and/or one or more acceleration sensors, is/are preferably integrated into or onto the housing of the chassis base module.

The chassis base module is preferably developed to form a safety domain control unit which contains at least one ESC module with ESC control functions. In the described case of the separation of the ESC function and brake function, it is therefore the case in one development of the invention that the brake controller does not comprise any ESC control functions.

In the motor vehicle control system according to aspects of the invention, the steering angle is preferably sensed, and the sensing of the steering angle is carried out in a region which is spatially separated from the brake system and from the chassis base module.

Signals of wheel speed sensors are fed to the motor vehicle control system according to aspects of the invention. The wheel speed sensors are preferably active magnetic field sensors which transmit wheel speed information and, in particular, additional information to a device for processing wheel signals via a current interface. The wheel speed sensors here particularly preferably operate according to the Hall principle or the AMR principle.

The means of processing the wheel speed signals (wheel speed signal processing means) is preferably integrated into the chassis base module or the safety domain control unit.

According to one further preferred embodiment, the safety domain control unit also comprises at least one chassis control function. As a result of this linking in one controller, the chassis can be adapted more quickly to vehicle movement dynamics events or safety-related events (for example ESP intervention when the vehicle veers off).

According to one further preferred embodiment of the motor vehicle control system, said control system is equipped not only, as is customary, with one brake controller but with a plurality of brake controllers, in particular wheel-specific brake controllers, with the result that, for example, wheel-specific, axle-specific or brake-circuit-specific actuation of brake actuators (for example hydraulic wheel brake cylinders) can take place. For example, hydraulic or electrical brake actuators can be used as brake actuators.

BRIEF DESCRIPTION OF THE DRAWINGS

The invention is best understood from the following detailed description when read in connection with the accompanying drawings. Included in the drawings is the following features.

DETAILED DESCRIPTION OF THE PREFERRED EMBODIMENTS

Figure 1:
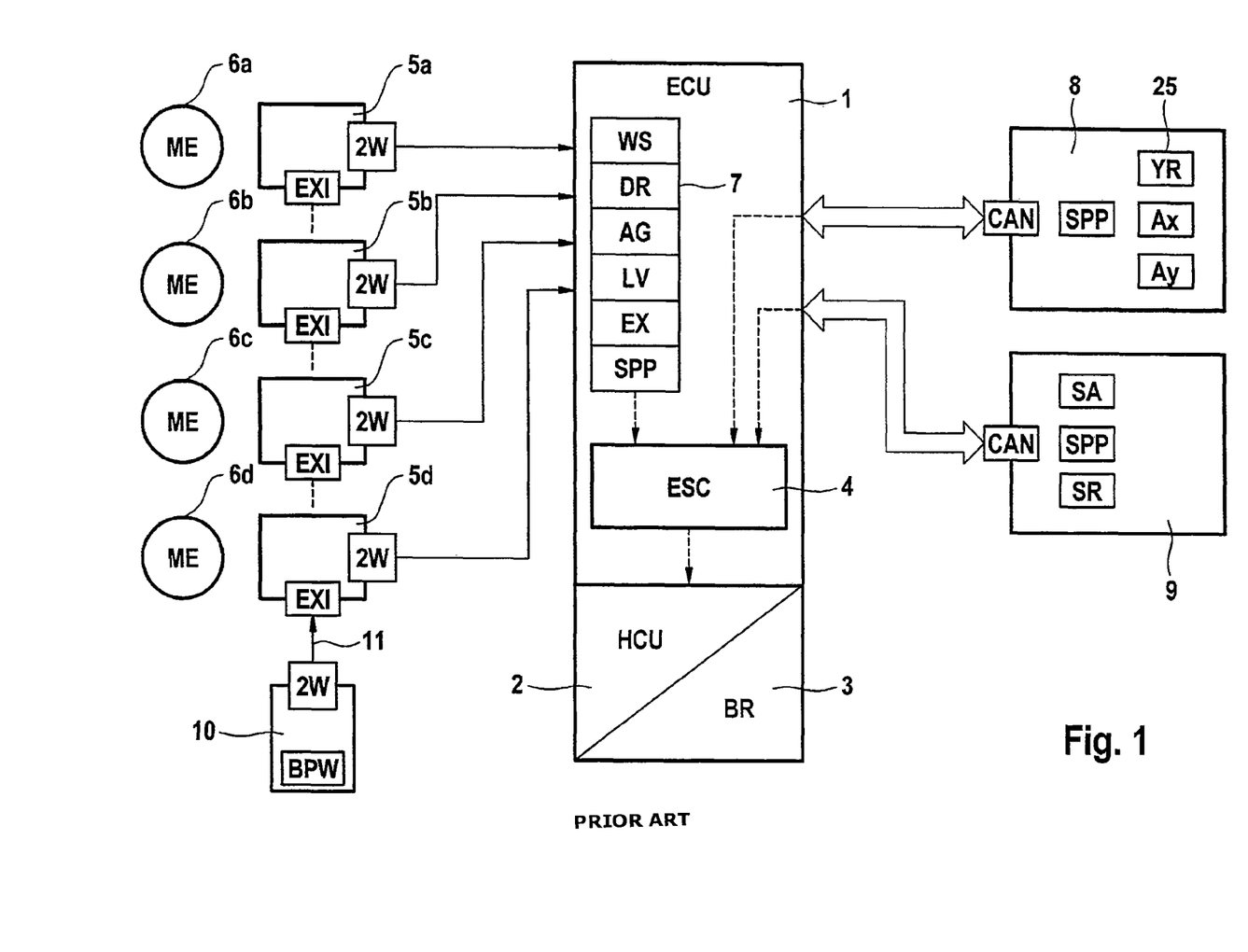
FIG. 1 is a schematic illustration of an ESC device (prior art)

FIG. 1 is a schematic illustration of a vehicle movement dynamics device (electronic stability program ESP, electronic stability control ESC) which is known per se and which interacts, in a closely functionally connected fashion, with an electronically controlled brake system (ECU/HCU/BR). The latter is composed essentially of a combination of an electronic brake controller (ECU) 1 with a hydraulic control unit (HCU) 2 which can influence the service pressure of the brakes (BR) 3. As is also the case with the ABS function, the vehicle movement dynamics controller (ECU-resident ESC control algorithms) 4 ESC can change the wheel brake pressure by means of the brake controller. At the ESC controller, the instantaneous ESC-specific dynamic state of the vehicle is continuously sensed by means of wheel speed sensor systems 5, 6, inertial sensors 8 and steering movement sensors 9, and is compared with internally calculated setpoint values of a vehicle model. If the deviations of the instantaneous vehicle state exceed the tolerance thresholds of the setpoint values, each of the four brakes is returned into a stable state of the vehicle depending on the threshold values, and not as a vehicle movement which has been assessed as being permissible, in particular a skidding movement, by separate activation of the four brakes.

The four wheel speed sensing systems, composed of the active wheel speed sensors 5a, 5b, 5c, 5d in interaction with associated encoders 6a, 6b, 6c, 6d, have an essential significance for chassis control systems, in particular electronically controlled brake systems. In a currently modern embodiment, the sensors each have a two-wire connection (2W) to the ECU. An alternating sequence of permanently magnetic north/south pole areas, which form an encoder track which is enclosed to form a circle and is magnetized into the wheel bearing seals (ME), serves as an encoder (angle scale). In order to sense the wheel speeds, the wheel bearing seal is connected mechanically to the rotating ring of the wheel bearing and the encoder track is scanned in a contactless fashion by the fixed, active sensor. For this purpose, the sensor is magnetically coupled to the encoder track over an air gap. Active sensors are known in one design based on the Hall effect or using the various magneto-resistive effects, in particular the anisotropic magneto-resistive effect in which thin layers of permalloy change their ohmic resistance as a function of the strength and direction of a magnetic field running parallel through these layers. This takes place when the encoder track is moved past the sensor. An electronic circuit which is integrated into the circuit converts these changes in resistance into two different current levels which model the sequence of north pole and south pole as output signals themselves or as part of a more complex output signal. The method of functioning of the active sensors with a complex output signal is described in DE 196 34 715 (P 8775) and in DE 199 11 774 (P 9352), which are both incorporated by reference. In their industrially available embodiment, they supply not only the wheel speed (WS) but also various additional information such as the rotational direction (DR), air gap field strength (AG), undervoltage detection (LV), see DE 101 46 949 (P 10004) (which is incorporated by reference), and external status signals (EX), which can be transmitted from the wheel region, referred to as the wheel corner region by external status signal generators 10 via connecting lines 11 to an additional signal input (EXI) to the wheel speed sensors 5 and via the latter to the ECU. A corresponding external status signal can, for example, be an electronic brake lining wear marker (BPW) or an event-controlled time-invariant signal sequence of bits, as described in DE 101 50 760 (P 10018) (which is incorporated by reference). Characteristic values which permit control thresholds to be made more precise, as disclosed for example in DE 10 2006 036 270 (P 11316) (which is incorporated by reference), can be derived from the measurement of the air gap field strength.

The rotational speed information which is generated by the above sensors and, if appropriate, additional information is conditioned on an ECU internal basis in a decoder 7 with a signal preprocessing stage (SPP) and made available to the ESC algorithms 4. According to the present state of the art, the inertial sensors are accommodated in a separate housing unit 8 which is referred to as a sensor cluster or cluster, as described, for example, in DE 199 216 92 (P 9535) (which is incorporated by reference). These cluster housing units usually contain a yaw rate sensor (YR), a longitudinal acceleration sensor (Ay) and at least one transverse acceleration sensor (Ax), the signals of which first have to be conditioned and then transmitted to the ECU via a bus (CAN).

The ESC controller 4 also requires signals from a steering movement sensor system 9 which is generally accommodated in the region of the steering wheel. Signals for the steering angle (SA) and the rotational speed (SR) thereof are generated within this steering movement sensor system 9, conditioned and then transmitted to the brake controller 1 (ECU) via a bus (CAN).

Figure 2:
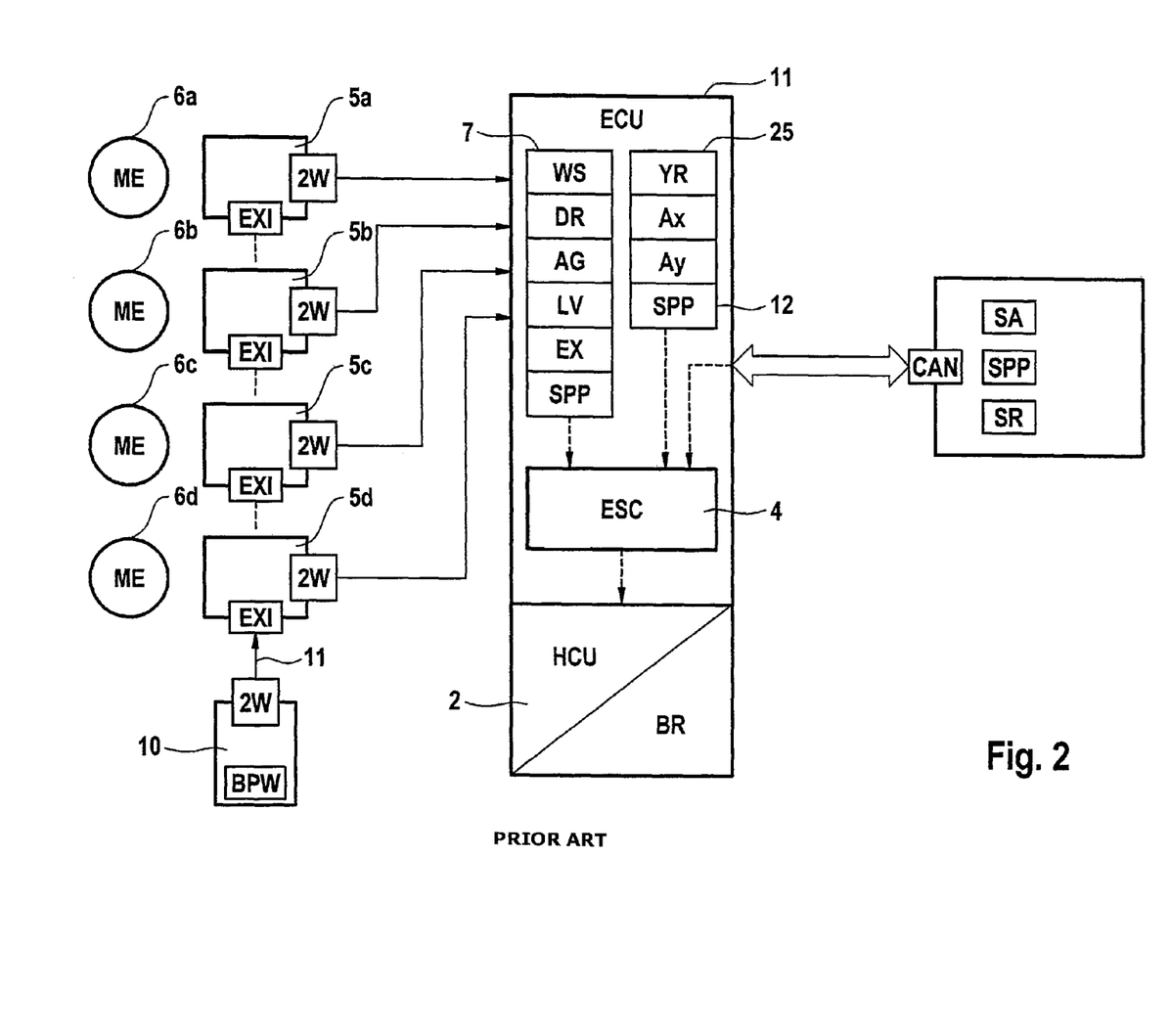
FIG. 2 is a schematic illustration of an ESC device with sensor integration (prior art)

The arrangement in FIG. 2 differs from the arrangement according to FIG. 1 in the integration of the inertial sensor system 25 into the brake controller 11 (ECU). An additional housing for the sensor cluster unit and the CAN connection which is also required for this unit can therefore be dispensed with. The electronic system for the specific conditioning of the yaw rate sensor signal and the signal preprocessing (SPP) 12 of the cluster are therefore then also a component of the brake controller 11. The steering angle sensor system 9 is arranged separated from the brake controller 12 in the arrangement described here. The signals of the four wheel speed sensors 5a to 5d are, as before, fed to the brake controller 11 and decoded there in the decoder 7. A brake system, which is constructed in accordance with the principle of the arrangement in FIG. 2, has already been described in EP 131 36 35 B1 (P 9928).

Figure 3:
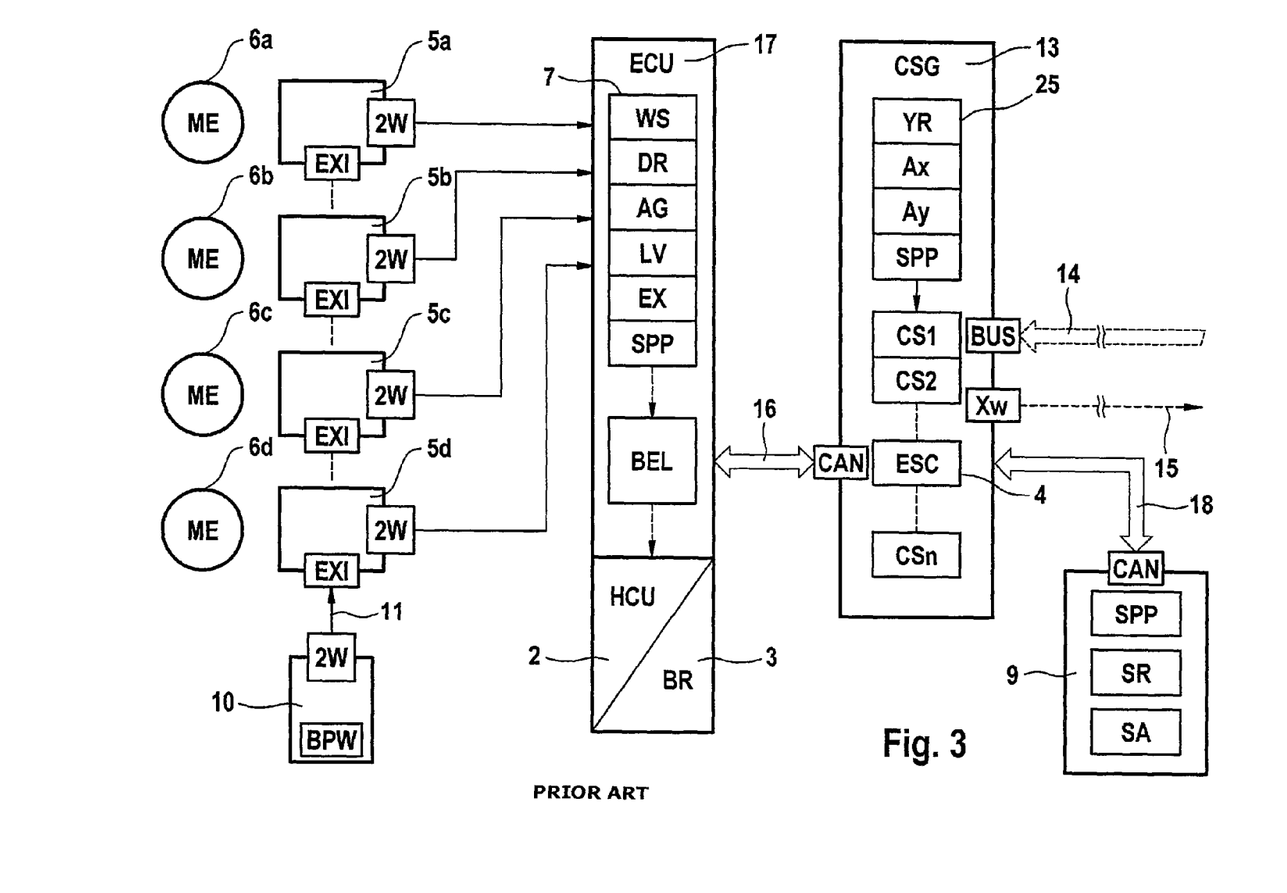
FIG. 3 is a schematic illustration of a chassis control device with an ESC function (prior art)

FIG. 3 illustrates the schema of a general chassis control device (CSG) 13 with an ESC function 4 integrated therein. In addition, both the elements of the inertial sensor system, for example (YR), (Ax), (Ay) and the operating algorithms or the open- and closed-loop control programs (CS1 . . . CSn) of different chassis systems as well as those of the ESC system 4 are integrated into the chassis control device (CSG) 13. For this purpose, the chassis control device 13 exchanges electrical signals with the participating chassis systems via bus connections 14 and line connections 15. In particular in order to implement the ESC function 4 there is a CAN connection 16 to the brake controller 17 and a CAN connection 18 to the steering angle sensor system 9. The signals of the four wheel speed sensors 5a to 5d are, as before, fed to the ECU and decoded there (decoder 7). In the exemplary embodiment described here of a brake system with a chassis control unit 13, the combination of the brake controller 17 and hydraulic unit 2 functions as an intelligent actuator with subordinate control functions with respect to the brake 3 and with a combination of a wheel-speed-signal processing unit 7, which serves as a source for sensor-related wheel speed information with respect to the chassis control device.

A significant common characteristic feature of the exemplary embodiments specified above according to FIGS. 1 to 3 is the direct feeding of the wheel speed information to the electronic brake controller 1, 11 or 17 through line connections of the wheel-speed-sensing systems to the electronic brake controller and associated signal conditioning means in these device units. According to the example of an arrangement in FIG. 4, this traditional system concept is, according to aspects of the invention, broken up and modularized. This is done, to be precise in that the sensing of the wheel speeds and additionally, if present, of the additional information which is encoded at the same time, is performed by means of a separate chassis base module 19 (CBM), which is dependent on the actual brake controller 24. A direct advantage of this concept is that the time-variant wheel speed signals, which are equidistant in terms of location (event-controlled), of the encoder track and the bits of the additional information which follow said wheel speed signals in a time-invariant fashion can easily be decoded on a signal-specific basis without the need for complex synchronization, which is technically never entirely free of information errors, with the time-invariant system clock of the ECU of, for example, approximately 10 ms. The additional information which has already been mentioned, such as described, for example, in DE 101 50 760 (P 10018), can therefore be transmitted in a bit-serial fashion via the sequence of additional information bits which follows a wheel speed pulse. For this purpose, a specific bit is available which models the logic status of the external input of the wheel speed sensors 5 (EXI) in the decoder 7 (EX). When an encoder with 48 north/south pole pairs is used, 96 bits (12 bytes) of external additional information, which can be additionally transmitted from the wheel corner via the wheel speed sensors, occur per revolution of the wheel. This information is generated on a location-invariant basis (linear, identical encoder angle pitch) but in a time-variant fashion (different wheel speed). The information could, for example, include a measure of the instantaneous tire pressure. The synchronization of this speed-dependent bit sequence with the system clock of the brake controller 24 would disadvantageously require a complex technical supplementation measure, while the signal-conditioning stage of a chassis base module is independent of such necessities. The signal-conditioning and processing stages 20 (SPP) can be optimized to the particularities of high-resolution, location-invariant sensing of signals with subsequent time-invariant additional information, can carry out specific filtering processes and can generally make available a continuous stream of digital wheel speed information via a bus 21.

Figure 4:
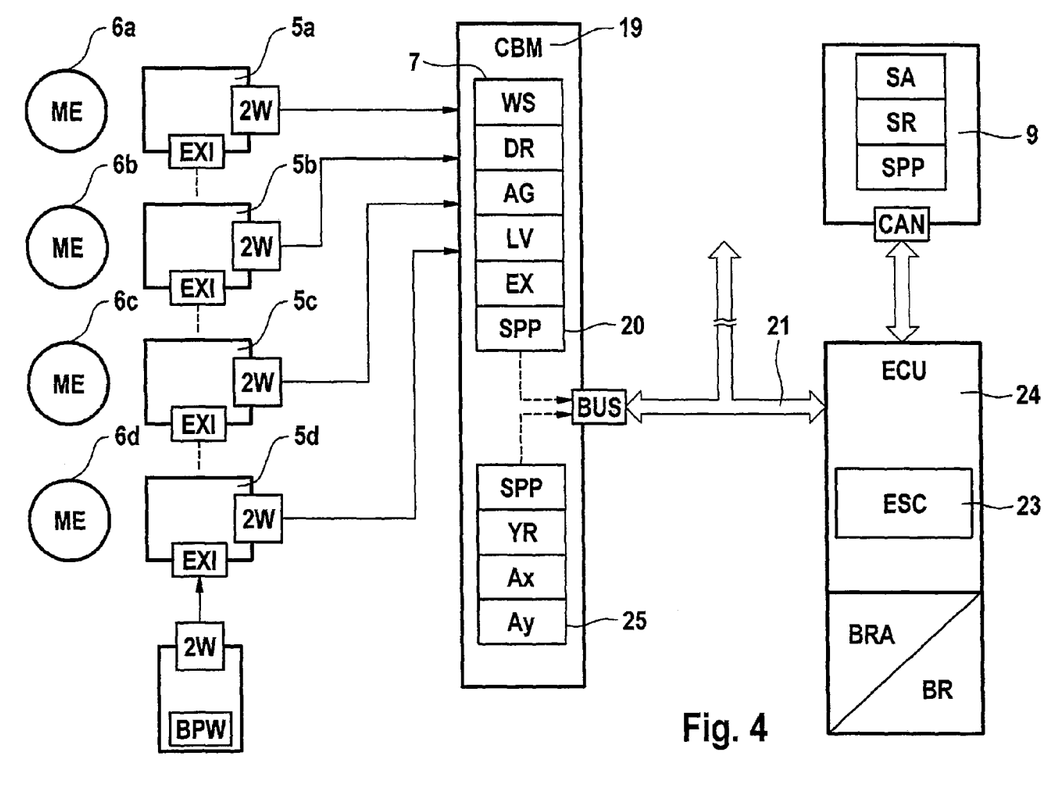
FIG. 4 is a schematic illustration of a brake system with a central chassis base module (CBM)

According to one preferred variant of the illustrated example, as illustrated in FIG. 4, the wheel speed sensing means 7 is combined in terms of equipment technology with the inertial sensor system 25, that is to say are combined in a common housing. In this variant, the ESC controller 23 remains, as in the past, in the electronic brake controller 24 to which the signals of the steering angle sensor system 9 also continue to be fed.

Figure 5:
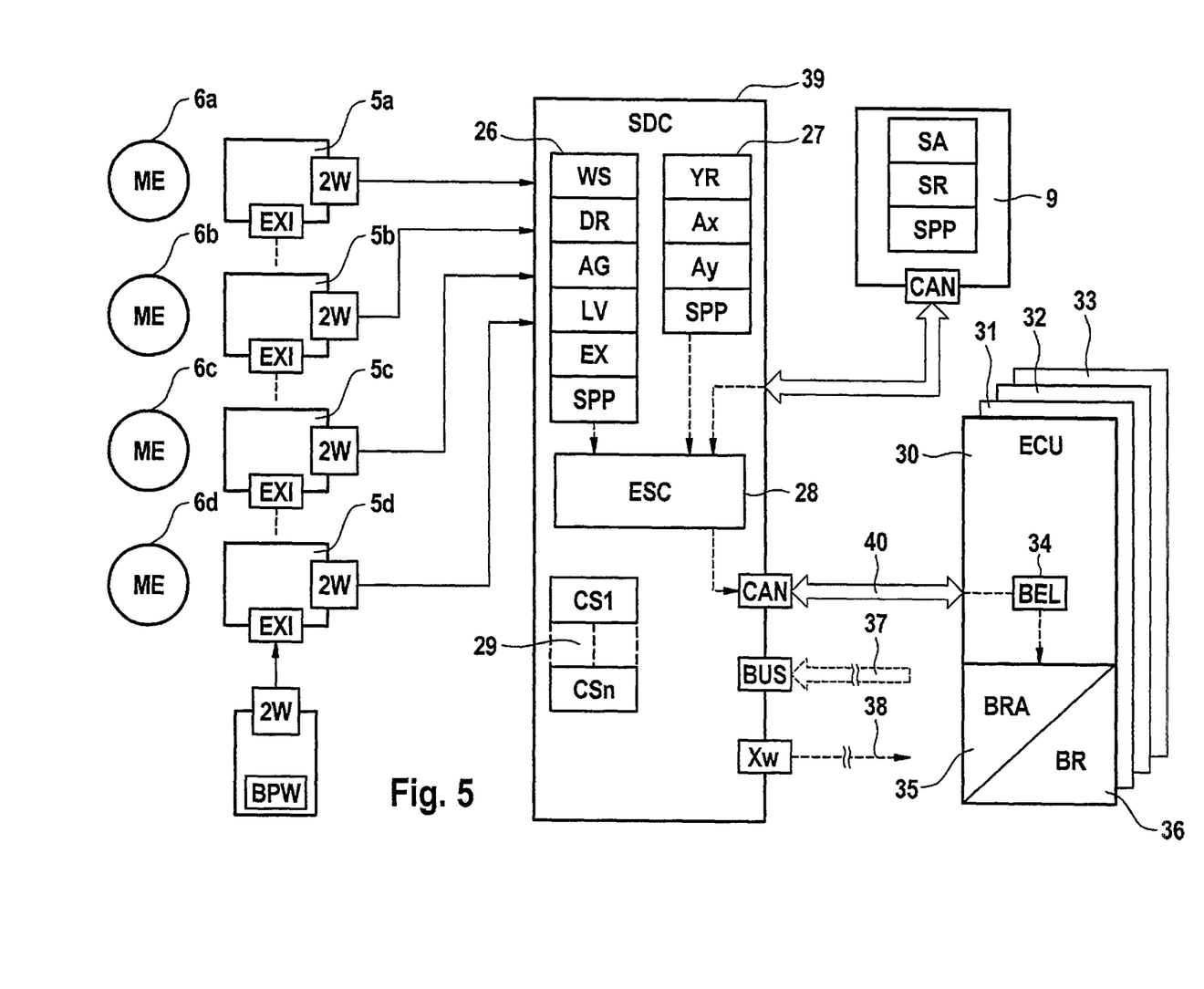
FIG. 5 is a schematic illustration of a chassis control device with a safety domain control unit (SDC).

FIG. 5 shows a control device arrangement in which a use of the chassis base module 19 (CBS) explained in FIG. 4 serves as a basic module of a safety domain control unit 39 (safety domain controller, SDC). The safety domain control unit 39 denotes an expanded chassis control unit, similar to CSG in FIG. 3, but with a predominantly safety-specific definition of purpose. In addition to the components of the chassis base module 19 (wheel-speed-processing and sensing means 26 and inertial sensor system 27), the ESC control algorithms 28 including the corresponding hardware and software for the ESC control functions as well as the hardware and software for further chassis functions 29 (CS1 . . . CSn), which communicate with the associated chassis devices via bus connections 37, 40 and/or line connections 38, are integrated into the safety domain control unit 39. In order to carry out the ESC function, the signals of the steering angle sensor 9 are fed to the safety domain control unit 39. The ESC control signals and preferably also brake control signals are fed via the bus connection 40 to the brake controller 30 or additionally to the brake controllers 31, 32, 33 which control brake actuators 35 (BRA) via their operating electronics (BEL) 34 in order to activate the brakes 36 (BR). The concept advantageously permits the parallel use of different brake actuators, for example both hydraulically operated and electrically operated actuators on different axles.

The invention claimed is:

1. An electronic motor vehicle control system which is of modular design, said electronic motor vehicle control system comprising:
   a plurality of wheel speed sensors arranged to monitor respective wheels on the vehicle, each wheel speed sensor detecting wheel speed information of the respective wheel on the vehicle, each wheel speed sensor detecting or receiving an additional information including at least one of rotational direction, air gap field strength, undervoltage detection, and external status signals from at least one other sensor such that the wheel speed information and the additional information are output from each wheel speed sensor as a temporally joint signal that is time variant based on a rotation speed of each respective wheel on the vehicle;
   at least one electronic brake controller;
   inertial sensors; and
   a chassis base module spatially separated from the electronic brake controller connected to the plurality of wheel speed sensors by wires and connected to the electronic brake controller by a bus, to which the time variant temporally joint signals including wheel speed information followed temporally by the additional information are received from each of the plurality of the wheel speed sensors via the wires, and are processed independent of the electronic brake controller and without synchronizing the signals to a clock of the electronic brake controller to filter out the additional information that temporally follows the wheel speed information in each of the time variant temporally joint signals to produce a continuous stream of digital wheel speed information, and transmits the stream in a bit serial fashion to the electronic brake controller via the bus,
   wherein the chassis base module and the brake controller are arranged in separate control device housings.

2. The system as claimed in claim 1 further comprising a hydraulic unit, wherein hydraulic valves for actuating brakes are integrated with the hydraulic unit, and wherein the electronic brake controller and the hydraulic unit form one integrally connected unit.

3. The system as claimed in claim 2, wherein the electronic brake controller and the hydraulic unit permanently form one integrally connected unit.

4. The system as claimed in claim 1, wherein the inertial sensor or sensors is/are integrated into or onto a housing of the chassis base module.

5. The system as claimed in claim 1, wherein the chassis base module is configured to form a safety domain control unit which contains at least one ESC module with ESC control functions.

6. The system as claimed in claim 5, wherein the brake controller does not comprise any ESC control functions.

7. The system as claimed in claim 1, wherein a steering angle is sensed and the sensing of the steering angle takes place in a region which is spatially separated from a brake system and from the chassis base module.

8. The system as claimed in claim 1, wherein the wheel speed sensors are active magnetic field sensors which transmit wheel speed information.

9. The system as claimed in claim 8, wherein the active magnetic field sensors transmit additional information to a wheel signal processor via a current interface.

10. The system as claimed in claim 9,
wherein the chassis base module is configured to form a safety domain control unit which contains at least one ESC module with ESC control functions, and
wherein the wheel speed signal processor is integrated into the chassis base module or the safety domain control unit.

11. The system as claimed in claim 10, wherein the safety domain control unit comprises at least one chassis control function.

12. The system as claimed in claim 1 further comprising a plurality of brake controllers.

13. The system as claimed in claim 12, wherein the plurality of brake controllers are configured for wheel-specific, axle-specific or brake-circuit-specific actuation of brake actuators.

14. The system as claimed in claim 13, wherein the brake actuators are hydraulic brake actuators or electrical brake actuators.

* * * * *